United States Patent Office 3,128,669
Patented Apr. 14, 1964

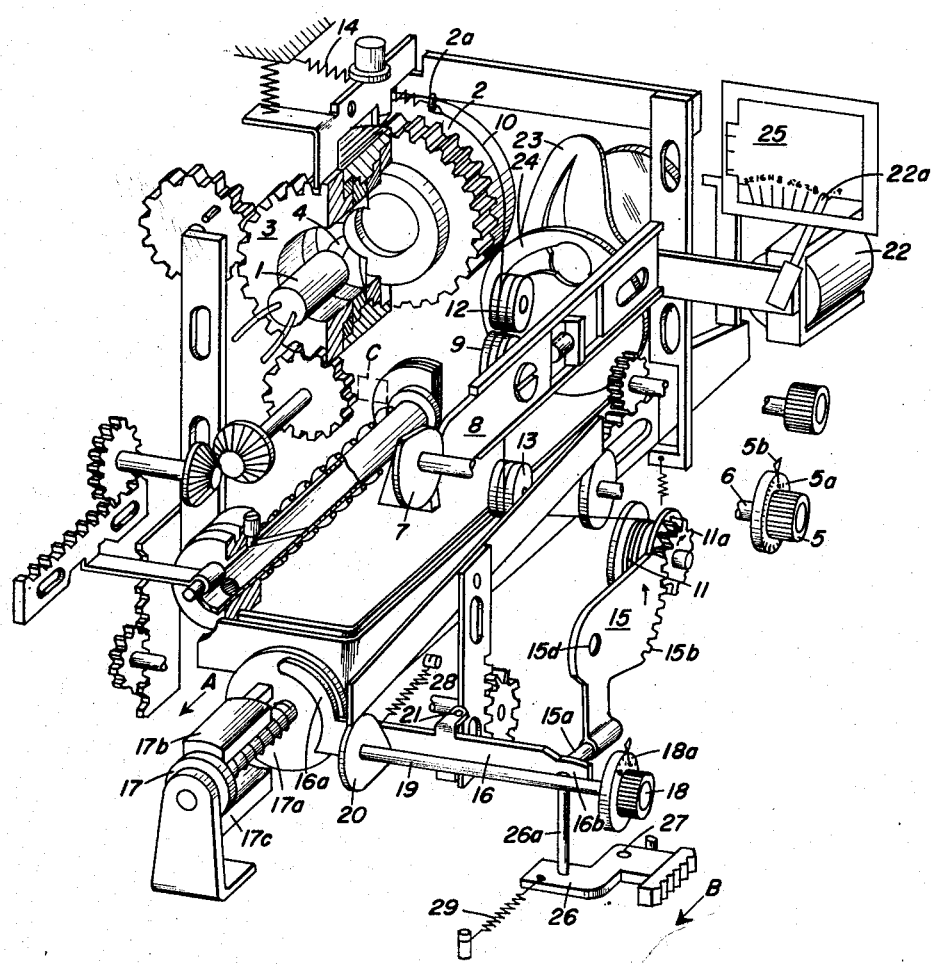

3,128,669
CAMERA WITH AUTOMATIC DIAPHRAGM CONTROL
Kurt Steisslinger, Stuttgart-Hedelfingen, Germany, assignor to Eastman Kodak Company, Rochester, N.Y., a corporation of New Jersey
Filed May 9, 1962, Ser. No. 193,419
9 Claims. (Cl. 88—16)

The invention relates to photographic apparatus having an automatic diaphragm control and more particularly to a cine camera in which an adjustable diaphragm is arranged in front of a photoelectric element for controlling the light incident on that element in accordance with the rate of movement of the film, the film sensitivity and/or any filter factor.

It is well known in photographic or cinematographic cameras to arrange a diaphragm in front of the photocell of an exposure meter to compensate for changes in various exposure factors. Usually the scene brightness or a combination of scene brightness with other exposure factors is compensated for by adjusting the diaphragm either manually or by some automatic means. It is also well known in cine cameras to provide an optical or acoustical indicator for warning the operator when the rate of film movement becomes too low due to decreasing spring tension or battery voltage, depending on the type of motor used for driving the film.

Controls for cine cameras are also known in which the shutter opening is automatically adjusted in accordance with any variation in the rate of movement of the film; that is, the frames per second of film movement. This is usually accomplished by coupling the setting device for the shutter opening and the means for governing the frames per second of film movement to the drive means in such a way that when either of these quantities is varied at a steady rate, the exposure time remains unchanged. But a sudden increase or decrease in the rate of film movement, for example, when starting the drive mechanism, causes over or under exposure of the film.

In the present invention, the disadvantages of the prior art are overcome by coupling the camera drive mechanism to an auxiliary diaphragm that is arranged in front of the photoelectric element for automatically regulating illumination of that element by scene light in response to any change in the rate of movement of the film due to the drive mechanism. In turn, the element is employed for automatically controlling a main diaphragm which is located on the taking lens axis for regulating admission of scene light to the film. Thus, changes in film speed are automatically compensated by adjustment of two diaphragms, thereby regulating exposure of the film. This is accomplished according to the invention by coupling the auxiliary diaphragm, that is, the diaphragm located in front of the photoelectric cell directly to a governor which controls the speed at which the film is moved past the film gate. At the same time, and independently of the set rate of the film movement, either of the diaphragms can also be adjusted to compensate for film sensitivity and/or any filter being used.

It is the primary object of the invention, therefore, to provide a cine camera in which a photoelectric exposure control system can be automatically adjusted in accordance with the rate of movement of the film.

Another object of the invention is to provide a photoelectric exposure control system in which the light incident on the photoelectric cell is controlled in accordance with frame frequency, film sensitivity, and/or any filter factor.

And still another object of the invention is to provide a camera having a photoelectric exposure control system in which the light incident on a photoelectric cell can be adjusted to a predetermined value in accordance with the rate of movement of the film when the film drive is not operative in order to ascertain the size of aperture in the diaphragm controlled by the photoelectric cell.

These and other objects and advantages will be apparent to those skilled in the art by the description of the invention which follows.

Reference is now made to the accompanying drawing wherein a perspective view of the camera mechanism is disclosed and in which various elements not related to the invention have been omitted.

The mechanism about to be described is mounted in a camera casing in a well-known manner, the camera being provided with an optical system for focusing an image on a photosensitive material or film at a point designated by the rectangle C. Also, a spring or electric motor can be used as the drive means for moving the film through the exposure station at a selected number of frames per second as well known in the art and shown in U.S. Patent 1,957,871.

A light-sensitive means 1, such as a photocell, has a diaphragm 4 aligned therewith and arranged between it and a window in the camera casing. The diaphragm is of a well-known multi-leaf type and the aperture therein is varied in size upon rotation of either of rings 2 or 3. A knob 5 on the outside of the camera casing is connected by shaft 6 to a cam 7 which abuts a slider plate 8 on which the roll 9 is freely rotatable. Roll 9 is in engagement with a cable 10, one end of which is connected to a stud 2a on ring 2 and the other end of which is secured to the cable sprocket drum 11. Rolls 12 and 13 also engage the cable 10 and serve as guides therefor, while spring 14 which is secured at one end to stud 2a maintains the cable taut between sprocket drum 11 and ring 2. A gear 11a on drum 11 meshes with the gear segment 15b on lever 15 which is in the form of a bell crank and pivotally mounted at 15d. The other leg of lever 15 is provided with a pin 15a which engages lever 16. Lever 16 is pivotally mounted at 21 intermediate its ends and has one end 16a in engagement with the disk 17a of the centrifugal governor 17 and the other end 16b in engagement with the pin 15a. The governor 17 is coupled in a well-known manner to the drive means, as in the above-mentioned patent, and the rate of movement of the film, that is, the number of frames per second, is set by knob 18 having a scale 18a, knob 18 being connected by shaft 19 to the setting cam 20.

When the manually operable release means is actuated by the operator, the drive means is connected to the governor and the means for intermittently engaging and moving the photo-sensitive material, as is well known in the art and shown in the above patent. As the governor is rotated the weights 17b and 17c arranged on the periphery thereof cause the disk 17a to be moved in the direction of the arrow A. As this occurs, lever 16 which is biased against the disk 17a by spring 28 is caused to pivot in a counterclockwise direction about its pivot 21 until it strikes cam plate 20 whereby the number of frames per second of film movement then corresponds to that set by the konb 18. With the pivotal movement of lever 16, the pin 15a causes lever 15 to be moved in a clockwise direction about its pivot 15d and the bell crank lever 15 then imparts rotary movement to the gear 11a on the drum 11. The cable 10 is then wound onto the drum 11 causing the ring 2 to be rotated for varying the diaphragm opening in front of the light-sensitive means 1.

In accordance with the opening in diaphragm 4 as established by the governor 17, the light incident on the photocell 1 is varied accordingly and provides a corresponding voltage output to the measuring device 22 which, in turn, moves the diaphragm blades 23 and 24 connected thereto as well as the pointer 22a in the viewfinder 25. The pointer 22a in the viewfinder 25 therefore indicates the size of the opening established by blades 23 and 24 in response to device 22 when the camera is operating at the set number of frames per second.

For adjusting the opening in diaphragm 4 in accordance with the film sensitivity (ASA Number), knob 5 is provided with a scale 5a of such numbers. The scale 5a is positioned with respect to index 5b and the cam 7 then moves the slider plate 8 together with the roll 9.

Since cable 10 is fixed to pin 2a which is movable and to drum 10 which is fixed when the camera is inoperative, the change in position of roll 9 results in movement of pin 2a rather than a change in the length of cable 10. This movement of ring 2 adjusts the opening in diaphragm 4 in accordance with the film sensitivity and independently of the rate of film movement.

When the camera is not running, the exposure aperture defined by diaphragm blades 23 and 24 and indicated by the pointer 22a in the viewfinder 25 is not correct, because the governor 17 and the opening in diaphragm 4 have been returned to their initial positions. In order to be able to read the opening to be established by blades 23 and 24 in accordance with the rate of movement of the film (frames per second setting) and the light conditions presented by the viewed scene when the camera is not running, lever 26 is provided which is pivotally mounted at 27 so that it swivels against the action of spring 29. With cam 20 set by knob 18, in accordance with the desired frames per second of movement of the film, lever 26 is moved in a clockwise direction about its pivot 27 and pin 26a carried by lever 26 engages the end 16b of lever 16 to move end 16a against the cam 20. This movement is transmitted, as described above, through the bell crank lever 15 and cable 10 to ring 2 so that the opening in diaphragm 4 is adjusted to the size it will assume when the camera is running. Under these conditions, device 22 will move blades 23 and 24 so as to provide a corresponding opening and the pointer 22a will indicate the same opening as if the camera were actually being operated.

Since other modifications and changes in the preferred embodiment of the invention will be apparent to those skilled in the art, the invention is not to be limited to the disclosed embodiment but is of a scope as defined by the appended claims.

I claim:
1. In a cine camera having a lens system arranged along an optical axis for focusing an image of a viewed scene onto a photosensitive material, selectively operable means for advancing said photosensitive material across said optical axis, a photoelectric element illuminatable by scene light, a first diaphragm located on said axis and having a variable aperture, and means coupling said element to said first diaphragm for varying the size of said aperture as a function of the illumination of said element, the combination comprising:
   (a) a second diaphragm having a variable aperture and arranged in front of said photoelectric element for controlling the illumination of said element; and
   (b) control means coupling said second diaphragm to said advancing means for varying the aperture in said second diaphragm as a function of the rate of advancement of said photosensitive material.

2. In a cine camera having a lens system arranged along an optical axis for focusing an image of a viewed scene onto a photosensitive material, drive means, advancing means adapted to intermittently move discrete frames of said photosensitive material across said optical axis at a settable number of frames per second, manually operable means for connecting said advancing means to said drive means, a photoelectric element illuminatable by scene light, a first diaphragm located on said axis and having a variable aperture, and means coupling said element to said first diaphragm for varing the size of said aperture as a function of the illumination of said element, the combination comprising:
   (a) a second diaphragm having a variable aperture and arranged in front of said photoelectric element for controlling the illumination of said photoelectric element in accordance with the set number of frames per second, and
   (b) control means operatively connected to said second diaphragm and responsive to movement of said photosensitive material for establishing the size of the aperture in said second diaphragm as a function of said set number of frames per second and for varying the size of the aperture in said second diaphragm as said photosensitive material approaches and recedes from the set number of frames per second.

3. The combination as defined in claim 2 including means operatively connected to said second diaphragm for initially varying the size of the aperture in said second diaphragm as a function of the sensitivity of said photosensitive material.

4. The combination as defined in claim 2, wherein said advancing means includes a centrifugal governor and a manually operable member adapted to be positioned in relation to said governor for controlling movement of said photosensitive material at a selected number of frame per second, and said control means includes an actuating member pivotally mounted intermediate its ends with one end in engagement with said governor and the other end coupled to said second diaphragm, said actuating member being moved by said governor into engagement with said manually operable member when said drive means is connected to said advancing means to establish the set number of frames per second and to very the size of the aperture in said second diaphragm.

5. The combination as defined in claim 4, wherein the other end of said actuating member is coupled to said second diaphragm by a gear train and a cable-pulley system.

6. The combination as defined in claim 5 including means operatively connected to said cable-pulley system for moving the cable independently of said control means to initially vary the size of the aperture in said second diaphragm as a function of the sensitivity of the photosensitive material.

7. In a cine camera having a lens system arranged along an optical axis for focusing an image of a viewed scene onto a photosensitive material, a viewfinder, drive means, advancing means including a centrifugal governor, said advancing means being adapted to intermittently move discrete frames of said photosensitive material across said optical axis at a settable number of frames per second, manually operable means for connecting said advancing means to said drive means, a photoelectric element illuminatable by scene light, a first diaphragm located on said axis and having a variable aperture, means coupling said element to said first diaphragm for varying the size of said aperture as a function of the illumination of said element, and means disposed in said viewfinder and responsive to said coupling means for indicating the size of the aperture in said first diaphragm, the combination comprising:
   (a) a manually operable member adapted to be positioned in relation to said governor for controlling movement of said photosensitive material at a selected number of frames per second;
   (b) an actuating member pivotally mounted intermediate its ends with one end in engagement with said governor and movable thereby into engagement with said manually operable member when said drive means is connected to said advancing means;
   (c) connecting means coupling the other end of said actuating member to said second diaphragm for varying the size of the aperture in said second diaphragm as a function of the rate of movement of said photosensitive material;

(d) means operatively connected to said connecting means for varying the size of the aperture in said second diaphragm as a function of the sensitivity of the photosensitive material independently of said actuating member; and (e) means arranged in relation to said actuating member and adapted to be manually actuated for moving said actuating member into engagement with said manually operable member independently of said governor so said indicating means will designate the size of the aperture in said first diaphragm when said drive means is connected to said advancing means.

8. The combination as defined in claim 7 wherein said connecting means comprises a bell crank lever having one arm in engagement with said actuating member and the other arm provided with a sector of gear teeth, a drum in driving engagement with said sector, and a cable interconnecting said drum to said second diaphragm for varying the aperture therein in accordance with the movement of said actuating member.

9. The combination as defined in claim 8 including means for moving said cable independently of said actuating member to vary the size of the aperture in said second diaphragm as a function of the sensitivity of the photosensitive material.

References Cited in the file of this patent
UNITED STATES PATENTS

| | | |
|---|---|---|
| 2,080,055 | Martin | May 11, 1937 |
| 2,250,898 | Tonnies | July 29, 1941 |